3,028,412
SPECIFIC α-CYANOMETHYL-α'-METHYL-
ADIPATES
Newman M. Bortnick, Oreland, and Gerard E. Gantert, Philadelphia, Pa., assignors to Rohm & Haas Company, Philadelphia, Pa., a corporation of Delaware
No Drawing. Filed Sept. 28, 1959, Ser. No. 842,606
5 Claims. (Cl. 260—464)

This invention concerns specific α-cyanomethyl-α'-methyladipates as new compositions of matter. It further deals with a method for the preparation of these compositions.

The present method deals with the bringing together and causing to react hydrocyanic acid and specific α-methylene-α'-methyladipates at particular temperatures and at atmospheric pressure, in the presence of a strongly alkaline cyanide-ion generating catalyst.

The products of the present invention are represented by the formula

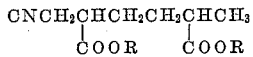

wherein R represents an alkoxyalkyl group of two to fourteen carbon atoms, an aralkyl group of seven to fourteen carbon atoms, an alkenyl group of two to eight carbon atoms, and a cycloalkyl or alkylcycloalkyl group of three to fourteen carbon atoms.

The alkenyl groups within the definition of R may be branched or straight chain in any of the known spatial configurations, such as normal, iso-, tertiary, and the like. Alkyl substituents on alicyclic or aromatic rings may occupy any of the possible ring positions.

There may typically be employed as R the groups methoxymethyl, methoxyethyl, methoxypropyl, methoxybutyl, methoxyoctyl, methoxydecyl, ethoxymethyl, ethoxyethyl, ethoxypropyl, ethoxyoctyl, propoxyethyl, propoxypropyl, propoxypentyl, propoxyheptyl, butoxymethyl, butoxyethyl, butoxybutyl, butoxynonyl, butoxydecyl, pentoxymethyl, pentoxybutyl, pentoxypentyl, pentoxyhexyl, pentoxyoctyl, hexoxymethyl, hexoxypropyl, hexoxyhexyl, hexoxyoctyl, heptoxymethyl, heptoxybutyl, heptoxyheptyl, octoxymethyl, octoxyethyl, octoxybutyl, octoxyhexyl, benzyl, phenylethyl, phenylbutyl, phenylhexyl, phenyloctyl, naphthylmethyl, naphthylethyl, naphthylpropyl, naphthylbutyl, vinyl, allyl, butenyl, hexenyl, octenyl, cyclopropyl, cyclobutyl, cyclopentyl, cyclohexyl, butylcyclopentyl, octylcyclohexyl, cyclopentylheptyl, and cyclohexyloctyl.

Illustrative of the reactants, having the formula

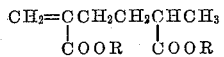

that may be used are dimethoxymethyl α-methylene-α'-methyladipate, diethoxyethyl α-methylene-α'-methyladipate, ethoxyethyl benzyl α-methylene-α'-methyladipate, dibenzyl α-methylene-α'-methyladipate, dicyclopentyl α-methylene-α'-methyladipate, dicyclohexyl α-methylene-α'-methyladipate, benzyl octylcyclohexyl α-methylene-α'-methyladipate, and benzyl naphthylethyl α-methylene-α'-methyladipate. These reactants are all known or prepared by known methods.

The method of this invention is conducted at temperatures in the range of about 150° to 300° C., preferably 175° to 250° C., on a batch basis. If conducted on a continuous basis the temperature may be somewhat higher, but preferably not above 340° C. On a continuous basis short contact times are employed. The above described temperatures must be rigorously adhered to or either the yields will be insignificant or excessive decomposition will occur.

Atmospheric pressure is employed with highly effective results. Superatmospheric pressures may be employed, if desired, especially at the higher temperatures.

A strongly alkaline cyanide ion-generating catalyst is required. Suitable catalysts include alkali metals and their carbonates, the lower alkoxides, oxides, cyanides, and peroxides of the alkali metals and alkaline earth metals, tertiary amines and quaternary ammonium bases. The catalyst may be defined as one whose aqueous 0.1 molar solution has a pH of about at least 9. Typical examples of the catalysts that may be used are sodium, potassium, lithium, sodium methoxide, potassium butoxide, lithium ethoxide, magnesium ethoxide, sodium oxide, potassium hydroxide, calcium oxide, barium hydroxide, strontium hydroxide, sodium peroxide, magnesium peroxide, potassium cyanide, lithium cyanide, barium cyanide, magnesium cyanide, sodium carbonate, potassium carbonate, trimethylamine, triethylamine, triethanolamine, octyldimethylamine, N-methylmorpholine, benzyltrimethylammonium hydroxide, dibenzyldimethylammonium hydroxide, dodecenyltriethylammonium hydroxide, and the like.

Since in some cases it may be that the catalyst is not soluble or at least not entirely soluble in the reaction system, it is desirable to provide agitation for the reaction components, such as by stirring, rocking, or the like.

The hydrocyanic acid used in the present invention may be introduced into the reaction environment in either the gaseous or liquid state.

The present reaction is exothermic in nature and the heat of reaction derived therefrom aids substantially in the maintenance of the defined reaction temperatures. In fact, it is highly advantageous to conduct the instant reaction by placing all of the components, except the hydrocyanic acid, into a reaction vessel, bringing the temperature of the system into the defined range, and then adding the hydrocyanic acid at a rate to approximately maintain the selected reaction temperature. It is necessary for maximum benefits that the hydrocyanic acid not be in excess or at least any appreciable excess during the course of the reaction. It is preferred that the hydrocyanic acid be added substantially as rapidly as it reacts.

It is preferred to keep the selected α-methylene-α'-methyladipate reactant in excess in order to minimize any tendency of the hydrocyanic acid to polymerize and to, thereby, maximize yields. It is highly satisfactory, in addition to the embodiment previously set forth, to add a mixture of hydrocyanic acid and the selected α-methylene-α'-methyladipate reactant to a mixture of the selected α-methylene-α'-methyladipate reactant and catalyst. Also, especially on subsequent runs when enough of the adduct formed by this invention has been prepared, it is frequently desirable to employ an embodiment of this invention wherein a mixture of hydrocyanic acid and the selected α-methylene-α'-methyladipate is added to a mixture of catalyst and the adduct formed by the present method, an α-cyanomethyl-α'-methyladipate. All of the embodiments specifically set forth hereinbefore are the preferred ones in that they give the highest yields. The advantages of the above embodiments will be apparent to one skilled in the art from the teachings of the present invention.

A solvent is not required in the present method since the excess adipate reactant or the product or both serve well in this respect. If a solvent is desired, however, one may employ satisfactorily a dialkylsubstituted amide such as dimethylformamide, dimethylacetamide, and the like.

At the conclusion of the present reaction, the catalyst is neutralized by the addition of acid, preferably of a mineral acid such as phosphoric, hydrochloric, sulfuric, and the like. The reaction mixture may then be filtered, if desired, and then distilled, preferably at reduced pressures. Unused reactants and water formed by the neutralization of the catalyst are removed first, by the distillation step. The product remains as the residue and it, too, may then be distilled to obtain maximum purity, if desired.

Time is not a critical factor in the present instance, but may merely reflect upon the yields obtained. Times of about one to twenty hours or more are conveniently employed depending on the reactants, temperatures, and catalysts used.

The reactants of this invention combine on a substantially equimolecular basis to produce the products of this invention in yields consistently in the range of 90 to 93% and above. The products are stable in the presence of the catalysts employed. They are colorless, oily liquids of marked utility.

It is sometimes advantageous to employ the dimethyl or diethyl ester of α-methylene-α'-methyladipic acid and then, after the reaction with hydrocyanic acid, obtain any of the other esters of this invention by transesterification. It is, however, as stated previously, quite satisfactory to start with the adipate reactant in the ester form desired in the product.

If the R symbols in the product are to represent identical groups in the product, it is often preferable to form the products directly by reacting the proper ester reactant with hydrocyanic acid, although transesterification may be satisfactorily employed. If the R symbols are to stand for different groups and one of the R groups could be supplied by an ROH compound having a boiling point of about 150° C. or more, the transesterification modification is somewhat preferable, using an adipate reactant in which the R group to be replaced is preferably methyl or ethyl. Either one or two groups may be transesterified.

If it is desired to obtain ester products of this invention by transesterification instead of by direct addition of the desired ester of α-methylene-α'-methyladipic acid to a hydrocyanic acid, the dimethyl or diethyl ester of α-methylene-α'-methyladipic acid is first reacted with hydrocyanic acid. The transesterification is conducted in the presence of a strongly acidic esterifying catalyst, including sulfuric acid, a lower alkanesulfonic acid such as butanesulfonic acid, or an arylsulfonic acid such as p-toluenesulfonic acid, and the like, or a strongly alkaline esterifying catalyst such as sodium methoxide, potassium ethoxide, and the like. An acid catalyst is preferred. There may also be employed a strongly acidic ion-exchange resin, such as a sulfonated polystyrene or sulfonated phenol-formaldehyde resin.

The transesterification is preferably conducted at the reflux temperature of the reaction mixture, which is usually in the range of about 100° to 275° C., preferably about 150° to 225° C. The pressure is adjusted, when necessary, to conform to the above temperatures. Also, if desired, small amounts of a volatile inert organic solvent, such as toluene, xylene, or the like, may be used to help regulate the reflux temperature. Methyl or ethyl alcohol is distilled off as the transesterification progresses and the reaction is continued until the theoretical amount of methyl or ethyl alcohol is collected. In this way it is possible to transesterify either one or both of the ester groups concerned, as desired. At the conclusion of the transesterification the product is isolated, such as by neutralizing the catalyst, filtering, and then distilling, preferably under reduced pressure.

The products of this invention are useful as plasticizers, especially for polyvinyl chloride. For instance, a mixture of 37 parts of a compound of this invention, 55 parts of polyvinyl chloride, 0.90 part of tribasic lead sulfate, and 0.48 part of stearic acid milled for seven minutes at 325° F. gave a tough flexible film of good utility. The present compounds are useful as synthetic lubricants in which applications they exhibit high viscosity indices, low pour points, and low volatilities.

The products of this invention are useful as pesticides especially as fungicides, being particularly effective against *Stemphylium sarcinaeforme* and *Monilinia fructicola*. These products are non-phytotoxic even in concentrations as high as 1.0%, as evaluated against tomato plants in a standard phytotoxicity test. The compounds of this invention are insecticides and particularly may be employed in standard 10% dust formulations against the rice weevil.

The compounds of this invention as well as the method for their preparation may be more fully understood from the following examples that are offered by way of illustration and not by way of limitation. Parts by weight are used throughout.

*Example 1*

Into a three-necked flask, equipped with stirrer, thermometer, ice-water cooled condenser and equalized-pressure dropping funnel, there are charged 800 parts of dibenzyl α-methylene-α'-methyladipate and 16.3 parts of potassium cyanide. The mixture is heated to 150° C. and then 114 parts of anhydrous hydrogen cyanide is added dropwise over a four-hour period. Stirring is continued for three hours at 155° to 160° C. after all of the hydrocyanic acid has been added. After the reaction mixture has stood at room temperature all night 19.2 parts of aqueous 85% phosphoric acid is added and the reaction mixture is distilled under reduced pressure. The product is isolated, and identified as dibenzyl α-cyanomethyl-α'-methyladipate.

In a similar manner, using a metallic sodium catalyst, there are prepared dihexenyl α-cyanomethyl-α'-methyladipate, dinaphthylethyl α-cyanomethyl-α'-methylapidate, and benzyl cyclohexyl α-cyanomethyl-α'-methyladipate.

*Example 2*

There are introduced into a reaction vessel five parts of sodium methoxide and 432 parts of dimethoxyethyl α-methylene-α'-methyladipate. The mixture is heated to 165° C. and then there is introduced slowly a mixture of 150 parts of hydrocyanic acid and 288 parts of dimethoxyethyl α-methylene-α'-methyladipate. The mixture is stirred at 160°–180° C. for two hours after all of the mixture has been added. The reaction system is allowed to cool and the reaction mixture is neutralized with phosphoric acid. The product is isolated by distillation at reduced pressure and is identified as dimethoxyethyl α-cyanomethyl-α'-methyladipate.

In like manner, using a potassium carbonate catalyst, there are produced benzyl naphthylethyl α-cyanomethyl-α'-methyladipate, benzyl cyclopentyl α-cyanomethyl-α'-methyladipate, diallyl α-cyanomethyl-α'-methyladipate, and dicyclohexyl α-cyanomethyl-α'-methyladipate.

This application is a continuation-in-part of Application Serial No. 593,039, filed June 22, 1956, now abandoned.

We claim:

1. As a composition of matter, the compound having the formula $$\underset{\underset{COOR}{|}}{CNCH_2CH}CH_2\underset{\underset{COOR}{|}}{CHCH_3}$$

in which R is a member from the class consisting of an alkoxyalkyl group of two to fourteen carbon atoms, an aralkyl group of seven to fourteen carbon atoms, an alkenyl group of two to eight carbon atoms, a cycloalkyl and an alkylcycloalkyl group of three to fourteen carbon atoms.

2. As a composition of matter, the compound having the formula $$\underset{\underset{COOR}{|}}{CNCH_2CH}CH_2\underset{\underset{COOR}{|}}{CHCH_3}$$

in which R is an aralkyl group of seven to fourteen carbon atoms.

3. As a composition of matter, dibenxyl α-cyanomethyl-α'-methyladipate.

4. As a composition of matter, dimethoxyethyl α-cyanomethyl-α'-methyladipate.

5. As a composition of matter, diallyl α-cyanomethyl-α'-methyladipate.

References Cited in the file of this patent

UNITED STATES PATENTS 2,224,022    Kurtz _____ Dec. 3, 1940

FOREIGN PATENTS 707,852    Germany _____ July 5, 1941

OTHER REFERENCES

Beilstein's Handbuch der Organischen Chemie, volume 2, page 833 (1920).

Migrdichian: "Organic Cyanogen Compounds," pp. 220–221 (1947).

Albertson: 47 C.A., page 6417 (1953).

Treibs et al.: 47 C.A., pages 1603–1604 (1953).